US010762119B2

(12) United States Patent
Sung et al.

(10) Patent No.: US 10,762,119 B2
(45) Date of Patent: Sep. 1, 2020

(54) SEMANTIC LABELING APPARATUS AND METHOD THEREOF

(71) Applicant: Samsung Electronics Co., Ltd., Suwon-si (KR)

(72) Inventors: Jae Mo Sung, Hwaseong-si (KR); Min Young Mun, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 456 days.

(21) Appl. No.: 14/691,876

(22) Filed: Apr. 21, 2015

(65) Prior Publication Data

US 2015/0302013 A1   Oct. 22, 2015

(30) Foreign Application Priority Data

Apr. 21, 2014  (KR) .................. 10-2014-0047687

(51) Int. Cl.
*G06F 16/00* (2019.01)
*G06F 16/35* (2019.01)
(Continued)

(52) U.S. Cl.
CPC ....... *G06F 16/355* (2019.01); *G06Q 10/1091* (2013.01); *G06Q 50/01* (2013.01); *G06Q 50/10* (2013.01); *H04L 61/609* (2013.01)

(58) Field of Classification Search
CPC ..................... G06F 17/3071; G06F 16/355
(Continued)

(56) References Cited

U.S. PATENT DOCUMENTS 7,669,147 B1 * 2/2010 Molander ............. G06F 3/0482
                                                               707/693
7,843,454 B1 * 11/2010 Biswas ................... G06T 13/80
                                                               345/473
(Continued)

FOREIGN PATENT DOCUMENTS

JP       2003-296782 A     10/2003
JP       2006-301884 A     11/2006
(Continued)

OTHER PUBLICATIONS

Chinese Office Action dated Jan. 30, 2019 in counterpart Chinese Patent Application No. 201510191873.X (13 pages in English, 9 pages in Chinese).

(Continued)

*Primary Examiner* — Mark E Hershley
(74) *Attorney, Agent, or Firm* — NSIP Law

(57) ABSTRACT

A semantic labeling apparatus and method thereof include a place identifier processor configured to, based on location data of a user, generate place attributes of places that indicate information of a user visit for each place, wherein user location remains unchanged within the places for a predetermined period of time. A group identifier processor is configured to cluster the places based on the place attributes, classify the places into groups, acquire a semantic label for each of the groups, and designate the acquired semantic label as the semantic label of each of the groups. A label determiner is configured to determine the semantic label of each of the groups as a semantic label of each member place of each of the groups.

21 Claims, 18 Drawing Sheets

(51) Int. Cl.
*H04L 29/12* (2006.01)
*G06Q 10/10* (2012.01)
*G06Q 50/10* (2012.01)
*G06Q 50/00* (2012.01)

(58) Field of Classification Search
USPC .......................................................... 707/739
See application file for complete search history.

(56) References Cited

U.S. PATENT DOCUMENTS

| | | | | |
|---|---|---|---|---|
| 8,421,881 | B2* | 4/2013 | Chung | H04N 5/23222 348/229.1 |
| 8,429,103 | B1* | 4/2013 | Aradhye | G06N 99/005 706/12 |
| 8,510,238 | B1* | 8/2013 | Aradhye | G06N 99/005 706/12 |
| 8,600,967 | B2* | 12/2013 | Jin | G06F 16/00 707/706 |
| 8,644,596 | B1* | 2/2014 | Wu | G06K 9/00201 382/154 |
| 8,838,436 | B2* | 9/2014 | Liu | G06F 17/2785 704/4 |
| 8,869,200 | B2* | 10/2014 | Sullivan | H04N 5/50 725/14 |
| 8,886,576 | B1* | 11/2014 | Sanketi | G06F 17/30038 706/12 |
| 9,152,726 | B2* | 10/2015 | Lymperopoulos | G06F 16/9537 |
| 9,177,381 | B2* | 11/2015 | McKinnon | G06T 7/593 |
| 9,223,461 | B1* | 12/2015 | Brown | G06F 3/0485 |
| 9,401,097 | B2* | 7/2016 | Kim | G09B 19/00 |
| 9,432,805 | B2 | 8/2016 | Narayanan et al. | |
| 9,465,890 | B1* | 10/2016 | Wilson | G06F 17/30241 |
| 9,552,334 | B1* | 1/2017 | Meisels | G06F 17/218 |
| RE46,310 | E* | 2/2017 | Hoffberg | G06F 3/0482 |
| 9,996,626 | B1* | 6/2018 | Bailey | G06F 7/00 |
| 2005/0220341 | A1* | 10/2005 | Akahori | G06K 9/00664 382/170 |
| 2006/0235926 | A1* | 10/2006 | Naruse | G06F 17/3089 709/203 |
| 2008/0091728 | A1* | 4/2008 | Diederiks | G06F 17/30011 |
| 2008/0313229 | A1* | 12/2008 | Taswell | G06Q 20/208 |
| 2009/0254971 | A1* | 10/2009 | Herz | G06Q 10/10 726/1 |
| 2009/0287657 | A1* | 11/2009 | Bennett | G06F 16/9535 |
| 2009/0319329 | A1* | 12/2009 | Aggarwal | G06Q 30/02 709/224 |
| 2010/0070928 | A1* | 3/2010 | Goodger | G06F 16/9577 715/838 |
| 2010/0185517 | A1* | 7/2010 | Higgins | G06Q 30/02 705/14.58 |
| 2010/0185518 | A1* | 7/2010 | Higgins | G06Q 30/02 705/14.58 |
| 2010/0278396 | A1* | 11/2010 | Mitsuhashi | G06K 9/00624 382/118 |
| 2011/0007975 | A1* | 1/2011 | Kazama | G06K 9/00234 382/225 |
| 2011/0057790 | A1* | 3/2011 | Martin | G06Q 10/109 340/539.13 |
| 2011/0125744 | A1* | 5/2011 | Immonen | G06F 16/29 707/737 |
| 2011/0129159 | A1* | 6/2011 | Cifarelli | G06K 9/6226 382/224 |
| 2011/0187716 | A1* | 8/2011 | Chen | G06F 3/048 345/427 |
| 2011/0202523 | A1* | 8/2011 | Ota | G06F 16/583 707/722 |
| 2011/0279453 | A1* | 11/2011 | Murphy | G06T 13/00 345/420 |
| 2011/0320450 | A1* | 12/2011 | Liu | G06F 16/955 707/737 |
| 2012/0059683 | A1* | 3/2012 | Opalach | G06Q 10/06 705/7.27 |
| 2012/0075433 | A1* | 3/2012 | Tatzgern | G06T 11/60 348/50 |
| 2012/0109715 | A1* | 5/2012 | Wu | G06Q 30/0201 705/7.33 |
| 2012/0185540 | A1* | 7/2012 | Hildorsson | H04W 8/186 709/204 |
| 2012/0330922 | A1* | 12/2012 | Kong | G06F 16/434 707/709 |
| 2012/0330952 | A1* | 12/2012 | Kong | G06F 16/951 707/737 |
| 2013/0079031 | A1* | 3/2013 | Kuhn | H04W 4/043 455/456.1 |
| 2013/0080457 | A1 | 3/2013 | Narayanan et al. | |
| 2013/0167196 | A1* | 6/2013 | Spencer | H04W 8/22 726/3 |
| 2013/0246419 | A1* | 9/2013 | Kwak | G06F 17/30029 707/736 |
| 2013/0345957 | A1* | 12/2013 | Yang | G06N 5/02 701/300 |
| 2013/0346347 | A1* | 12/2013 | Patterson | G06N 99/005 706/12 |
| 2014/0005928 | A1* | 1/2014 | Giannetta | G01S 19/49 701/431 |
| 2014/0068433 | A1* | 3/2014 | Chitturi | H04N 21/41407 715/716 |
| 2014/0180798 | A1* | 6/2014 | Bailey | G06Q 30/06 705/14.45 |
| 2014/0188935 | A1* | 7/2014 | Vee | G06F 17/3043 707/771 |
| 2014/0218394 | A1* | 8/2014 | Hochmuth | G09G 5/377 345/629 |
| 2014/0236932 | A1* | 8/2014 | Ikonomov | G06F 16/248 707/722 |
| 2014/0310075 | A1* | 10/2014 | Ricci | H04W 4/21 705/13 |
| 2015/0113548 | A1* | 4/2015 | Stern | H04N 21/4826 725/9 |
| 2015/0113554 | A1* | 4/2015 | Stern | H04N 21/252 725/32 |
| 2015/0178321 | A1* | 6/2015 | Rivlin | G06F 16/583 707/728 |
| 2016/0004412 | A1* | 1/2016 | Meyer | G06F 3/0484 345/581 |

FOREIGN PATENT DOCUMENTS

| | | |
|---|---|---|
| JP | 4874351 B2 | 2/2012 |
| KR | 10-2009-0017151 A | 2/2009 |
| KR | 10-2011-0003849 A | 1/2011 |
| KR | 10-2012-0124524 A | 11/2012 |
| KR | 10-2013-0001383 A | 1/2013 |
| KR | 10-2013-0022919 A | 3/2013 |
| KR | 10-2014-000566 A | 1/2014 |
| KR | 10-2014-0000566 A | 1/2014 |
| WO | WO 2009/151925 A2 | 12/2009 |
| WO | WO 2011/070831 A1 | 6/2011 |
| WO | WO 2013/049360 A1 | 4/2013 |
| WO | WO 2013/129860 A1 | 9/2013 |

OTHER PUBLICATIONS

Japanese Office Action dated Feb. 19, 2019 in counterpart Japanese Patent Application No. 2015-087130 (7 pages in English, 4 pages in Japanese).

Matsumoto et al., "The Estimation Method for Appropriate Applications of Mobile Devices Based on Operational Logs with Location Information," 2012 Information Processing Society of Japan, Feb. 15, 2012, vol. 2012-ICS-165, No. 3, (8 pages in Japanese).

Extended European Search Report dated Nov. 2, 2015 in counterpart European Patent Application No. 15164461.4 (9 pages in English)

* cited by examiner

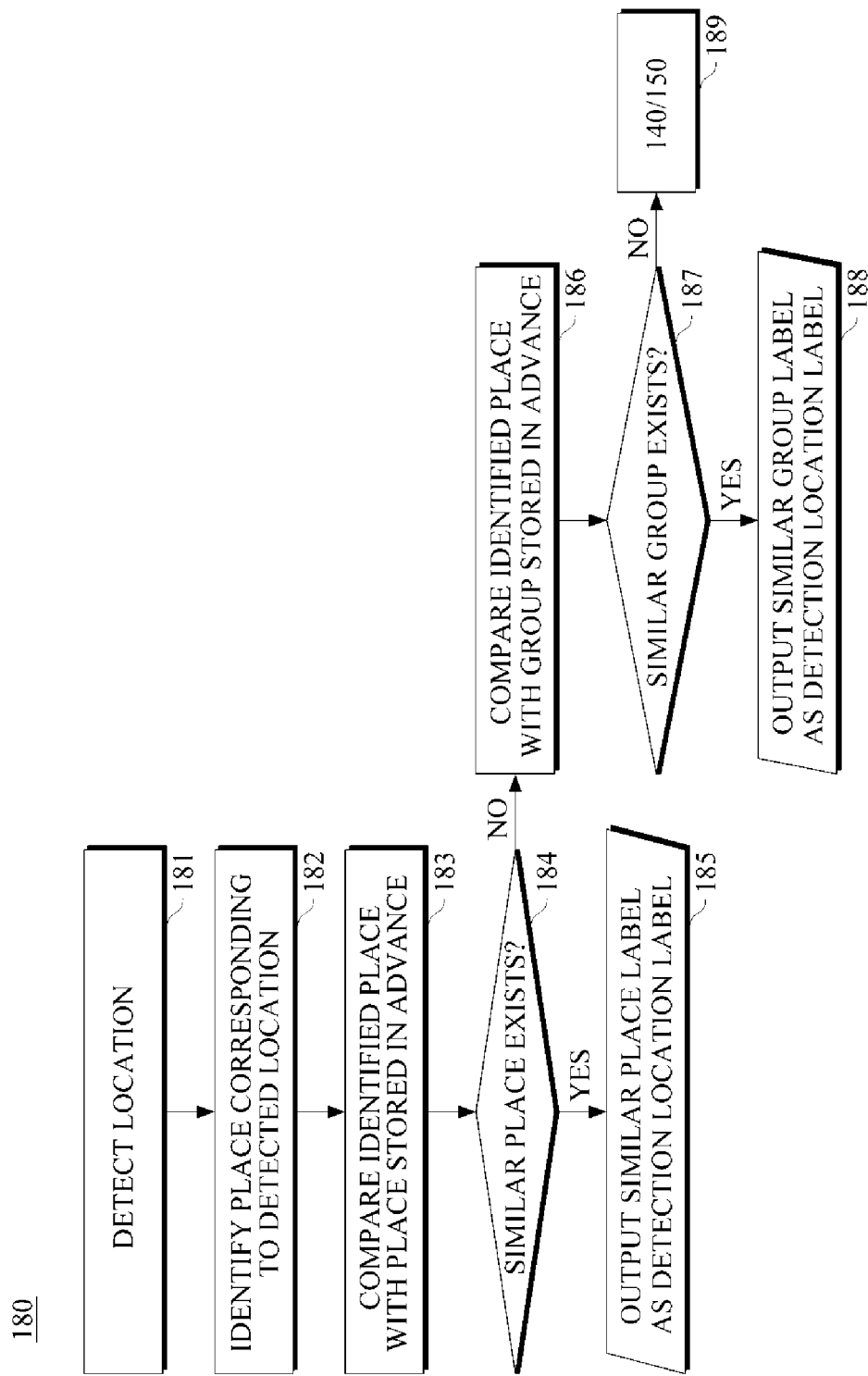

SEMANTIC LABELING APPARATUS AND METHOD THEREOF

CROSS-REFERENCE TO RELATED APPLICATION

This application claims the benefit under 35 U.S.C. § 119(a) of Korean Patent Application No. 10-2014-0047687, filed on Apr. 21, 2014, in the Korean Intellectual Property Office, the entire disclosure of which is incorporated herein by reference for all purposes.

BACKGROUND

1. Field

The following description relates to a semantic labeling technology that construes a position of a user.

2. Description of the Related Art

A mobile device such as, a smartphone, may be used in combination with a location tracking technology using a Global Positioning System (GPS) and a cell identification (ID) number to detect a physical location of a user. Based on such a location tracking technology, a location-based service (LBS) estimates and provides a service that the user is likely to need based on the location of the user and a specific location and provides the service. The LBS intelligently provides the user at a specific location personalized services, such as a personalized advertisement, personalized information, and a personalized device control. In order to achieve the personalization of the LBS, a semantic label associated with the user at a specific location is required to be defined in advance. The semantic label is information indicating that the specific location has significance to the user, such as, home, a school, a workplace, and a place for meeting. For example, a location of random geographical coordinates is, on one hand, a school to one user, but on the other hand, a workplace to another user.

Conventionally, the semantic label of a specific location is defined in advance in a manner designated by a user or a service provider. However, pre-defining the semantic label of the specific location has a disadvantage in not providing the LBS that is properly personalized. Also, because the user generally visits many places, a semantic labeling task of a method where the user manually sets the significance for all the places one by one may be annoying and inconvenient to the user.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In accordance with an embodiment, there is provided a semantic labeling apparatus, including a place identifier processor configured to, based on location data of a user, generate place attributes of places that indicate information of a user visit for each place, wherein user location remains unchanged within the places for a predetermined period of time; a group identifier processor configured to cluster the places based on the place attributes, classify the places into groups, acquire a semantic label for each of the groups, and designate the acquired semantic label as the semantic label of each of the groups; and a label determiner configured to determine the semantic label of each of the groups as a semantic label of each member place of each of the groups.

The location data may be detected by a sensor built in a mobile device.

The location data may further include at least one of a geographical user location, an application type operated in the mobile device, a number of incoming or outgoing calls performed by the mobile device, a number of incoming or outgoing short message services (SMS), and behaviors of the user detected by a motion sensor built-in the mobile device.

The place attributes may include identification information to distinguish between places and time information on a place of the places the user visits.

The place attributes may further include information based on the time information on the place the user visits.

The place attributes may further include information indicating an operating state of a mobile device of the user within the place.

The place attributes may further include information indicating user behaviors performed in the place and detected by a mobile device.

The group identifier processor may be configured to select, as a representative place, one member place of each of the groups, acquire a semantic label of the selected representative place from the user, and designate the acquired semantic label of the representative place as the semantic label of each of the groups.

The group identifier processor may be configured to select the one member place of each of the groups as the representative place based on the place attributes of member places.

The group identifier may be configured to select the one member place of each of the groups as the representative place based on information related to the user visit among the place attributes of member places of each of the groups.

In accordance with an embodiment, there is provided a semantic labeling method, including generating, based on location data of a user, place attributes of places that indicate information of a user visit for each place, wherein user location remains unchanged within the places for a predetermined period of time; clustering the places based on the place attributes, classifying the places into groups, acquire a semantic label for each of the groups, and designating the acquired semantic label as the semantic label of each of the groups; and determining the semantic label of each of the groups as a semantic label of each member place of each of the groups.

The location data may be detected by a sensor built in a mobile device.

The location data may further includes at least one of a geographical user location, an application type operated in the mobile device, a number of incoming or outgoing calls performed by the mobile device, a number of incoming or outgoing short message services (SMS), and behaviors of the user detected by a motion sensor built in the mobile device.

The place attributes may include identification information to distinguish between places and time information on a place of the places the user visits.

The place attributes may further include information based on the time information on the place the user visits.

The place attributes may further include information indicating an operating state of a mobile device of the user within the place.

The place attributes may further include information indicating user behaviors performed in the place and detected by a mobile device.

The semantic labeling method may also include selecting, as a representative place, one member place of each of the groups, acquiring a semantic label of the selected representative place from the user, and designating the acquired semantic label of the representative place as the semantic label of each of the groups.

The semantic labeling method may also include selecting the one member place of each of the groups as the representative place based on the place attributes of member places.

The semantic labeling method may also include selecting the one member place of each of the groups as the representative place based on information related to the user visit among the place attributes of member places of each of the groups.

In accordance with an embodiment, there is provided a non-transitory computer readable medium configured to control a processor to perform the semantic labeling method described above.

Other features and aspects may be apparent from the following detailed description, the drawings, and the claims.

BRIEF DESCRIPTION OF THE DRAWINGS

These and/or other aspects will become apparent and more readily appreciated from the following description of the embodiments, taken in conjunction with the accompanying drawings in which:

FIG. 18 is a flow chart illustrating a semantic labeling method, according to further another exemplary embodiment.

Figure 1:
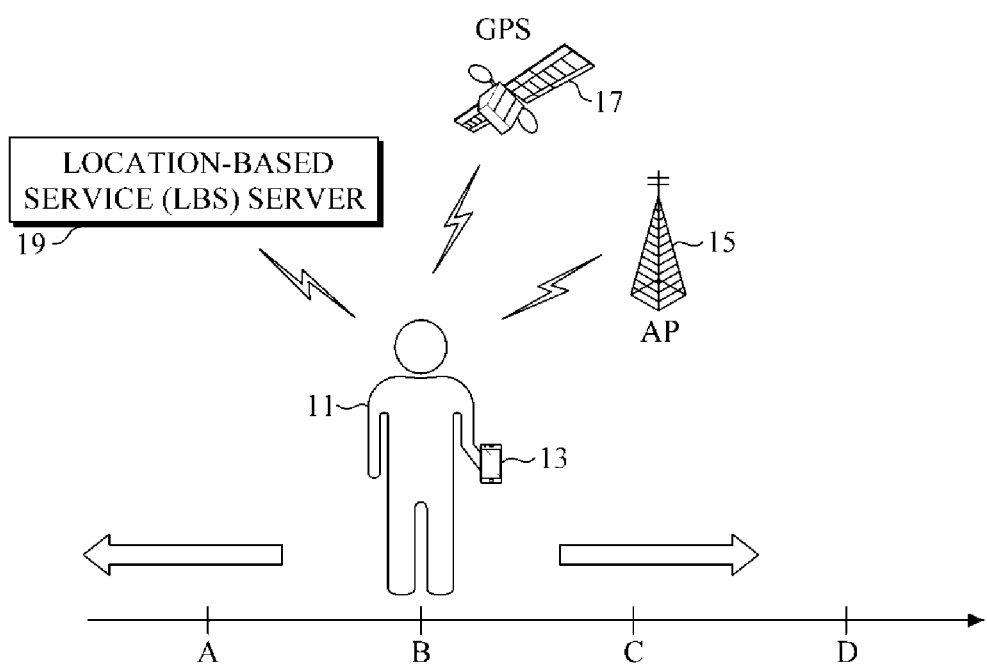
FIG. 1 is a diagram illustrating an example of an environment for a location-based service (LBS).

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or methods described herein will be apparent to one of ordinary skill in the art. For example, the sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

Throughout the drawings and the detailed description, the same reference numerals refer to the same elements. The drawings may not be to scale, and the relative size, proportions, and depiction of elements in the drawings may be exaggerated for clarity, illustration, and convenience.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

A location-based service (LBS) technology estimates a service that a user is likely to need based on a semantic label pre-defined or defined in advance associated with a specific location. For example, the LBS stores in advance semantic label information that a user manually sets in a mobile device as the significance of home and a workplace. Once the semantic label information is set, a global positioning system (GPS) sensor in the mobile device detect the user entering into the neighborhood of the pre-stored GPS coordinates of the workplace. Thus, schedule information is reviewed, which has been stored with relation to a significance of a geographical location or place where the user has entered, such as, the 'workplace'. Then, the reviewed schedule information is displayed on a display of the mobile device to be thereby provided to a user. In such an example, a personalized service may be provided with regard to a place whose semantic label is set in advance by a user. However, it is not possible to provide a personalized service for a place for which a semantic label is not set in advance.

For example, the user or an office worker may visit quite a number of places including, but not limited to, home, various places near home, places where the office worker visits between home and the workplace when commuting, the work place, various places near the workplace, and places for meeting with friends or for business. A semantic labeling manner that requires a user to manually set significance one by one with regard to a number of places is very annoying, inconvenient, and unrealistic. Furthermore, for some places, the user may have difficulty to select or define a word to use as a semantic label of the relevant place.

To resolve at least the disadvantages discussed above, a semantic labeling apparatus and method thereof, according to an exemplary embodiment, set the semantic label by the user only for some places, and defines proper semantic label with regard to the meaningful places of the user. According to an exemplary embodiment, the semantic labels are required, which the user has not set for all of the places, but only with regard to some places based on the semantic labels that the user has defined with regard to the some of the places. The semantic labels of other places that the user has not defined are automatically determined based on the semantic labels defined by a user with regard to the some of the places. Thus, the semantic label apparatus and method thereof, according to an exemplary embodiment, produce a semantic labeling of a partially-manual manner or a partially-automatic manner.

According to an exemplary embodiment, the semantic label that the user sets with regard to some places has a characteristic of a collective label. In other words, according to an exemplary embodiment, a number of different places may be classified into groups based on a preset standard. The user may separately set or define a semantic label for the classified groups, and the semantic label of a specific group may be considered a semantic label of all the places that are part of or compose the relevant group. As such, the semantic labeling apparatus and method thereof, according to an exemplary embodiment, perform a collective semantic labeling in a manner where, if the user manually defines one collective semantic label, this collective semantic label is automatically determined as a respective semantic label of various corresponding or associated places.

In addition, similarities between places that are geographically different from each other may be determined based on a preset standard. For example, based on visit information related to behaviors being performed when the user visits a specific place, one or more attributes are identified with regard to each place. Then, the similarities between the places are determined based on the attributes of the places. As a result, the places that have been determined as having similar attributes may be classified into one group. Then, the user may set a collective group semantic label associated with or identifying each group or representative place for each group. Thus, the group semantic label or the semantic label of the place is automatically defined as a semantic label of the places within the group. As such, the semantic labeling apparatus and method thereof, according to an exemplary embodiment, perform the semantic labeling in a manner where similarities between the places are automatically determined, grouped, and labeled to minimize a user's intervention.

According to such an exemplary embodiment, when an arbitrary location is detected, the semantic label at the detected location is automatically classified according to one of the semantic labels stored in advance based on attributes of the detected location. If the attributes of the detected location is not similar to attributes of the places where the semantic labels have been already determined, a new semantic label is semi-automatically determined according to the exemplary embodiment previously described.

In accordance with an illustrative configuration, 'a place' is a unit of information that includes a semantic label. According to an exemplary embodiment, among physical locations that are identified as a location of the user, the 'place' is a location where the user has stayed for more than a time duration set in advance, and also indicates a region including a specific size of area set in advance. A location where the user has not stayed for more than a time duration, among the detected locations of the user, has a high probability of having no special significance to the user. All of the detected locations of the user do not have to include a semantic label. Thus, the user is enabled to select the location where the user has stayed for more than a time duration as a place meaningful to the user. Furthermore, because places with personal meaning such as home, a workplace, a coffee shop, library, an institute, and a place for a part-time-job, are in general areas with more than a specific size of the extent, it is more reasonable that 'the place' as a unit to determine a semantic label is defined as an area with a specific radius.

The attributes of the place may include a place identifier. Each place may be separately distinguished by the place identifier. The place identifier is an identification number that is generated to uniquely distinguish each geographically different place.

Also, the attributes of the place include identification information to geographically identify the place. The geographical identification information of the place is referred to as 'a place profile'. The place profile includes geographical information, such as center coordinates of the place, a place radius, and other similar information. Each place includes one place profile.

As mentioned above, the place is a geographical area including a preset size of a region. The region of the place is shown with the place profile including the center coordinates and the radius. The center coordinates of each place is based on GPS coordinates, a neighboring base station ID, or cell ID coordinates, such as an access point ID. Generally, although GPS coordinates have an advantage of accurately identifying the location of the user in a narrow area unit of radii of a few meters or dozens of centimeters, there is a disadvantage of the location of the user not being identified in underground spaces, surroundings with obstructions such as mountains, bridges, or hills, or indoors where radio signals from the GPS satellite cannot reach. Thus, to detect the location of the user location in the underground spaces, surrounding with obstructions, or indoors, cell ID information including, but not limited to, Wi-Fi® access point or mobile base station identification information is also used. For example, since one base station of a third generation (3G) network covers an approximate 2 to 3 km radius of an area, the location of the user identified by a base station ID has an accuracy level to an extent of being able to pinpoint which subway station, shopping mall, or university is present the user's current location.

Furthermore, the attributes of the place selectively include visit information related to a relevant place a user visits. Such visit information is 'a visit profile', which includes various related information that is capable of being collected by a sensor detecting an operation event of the mobile device when the user visits a specific place. The visit profile includes the time that a user visits the specific place, that is the time the user enters the specific place, and time when the user leaves the place, the that the time that the visit ends. In addition, the visit profile includes related information, such as an amount of the user's activities and an operating state of a user mobile device that are both detected in the relevant place.

In accordance with an illustrative configuration, a term 'visit' counts as one visit from a time when the user enters a specific place to a time when the user leaves. In one example, a point in time, that is, a visit start and end time point when the user enters and leaves a specific place, may have differences from a point in time when the user physically entered and left the relevant place in a case where the location of the user is not consecutively detected in real time. For example, detecting the location of the user in second units may give a different burden on the apparatus compared to detecting the user's location in minute units. Thus, to avoid overloading the apparatus, a time interval of user location detection may be set relatively long. In such an exemplary embodiment, a time point when the user starts the visit at a specific place is determined based on a time point when the location of the user is first detected at the specific place. The point in time when the user starts the visit at the specific place is determined based on a point in time when the location of the user is first detected at this place, after the point in time when the visit is started. In addition, the point in time when the user finishes the visit at the specific place is determined based on a point in time when the location of the user is last detected at this place after the point in time when the visit began. The user may visit one place several times, for a long time or a very short time. Because the visit time is checked, the visit profile includes a function of a mobile device for the user to operate during the visit. For example, in a case where the mobile device is a smart phone that records amounts of activities by a motion sensor, such as an acceleration sensor, the visit profile would be defined to include exercises that the user performs during the visit at the specific location. In another example, the visit profile would include frequency of outgoing/incoming calls, and the frequency of transmitting/receiving short message services (SMS).

A visit profile is generated for each visit each. Visit profiles, which are generated during each different time period at one place may be related to each other. Thus, derivative information is generated by summing up the visit profiles with regard to each place. The generable derivative information, for example, includes, but it is not limited to, the accumulated number/time of the visits to the specific place during a day, and the accumulated number/time of visits to the specific place on a specific day of a week.

Each different place including geographically different coordinates from each other has a place profile different from each other. However, several places include similar visit profiles. For example, several places include similar visit profiles of a pattern where a user visits only during daytime. Several places have similar visit profiles of a pattern/where the user visits only in evening time. For instance, several places have similar visit profiles of a pattern where the user visits more than 30 times in daytime in a month. Several places may have similar visit profiles of a pattern where the user visits only on Wednesday nights. Several places may have similar visit profiles of a pattern where the user visits between 6 PM and 10 PM during a week and runs an application of a music player of a mobile device during the visit.

In an exemplary embodiment, similarities between the places are determined based on the visit profiles of the places. The places determined as similar are classified into one group. As such, a process of determining the similarities of the places and classifying the places into groups is referred to as 'clustering'. For each group, a place ID and a group ID of a similar identification number form are generated. Members included in each group, such as, the place IDs are related to the group ID of the relevant group. As such, one or more places including similar visit profiles are included as the members in each group.

In an exemplary embodiment, a semantic label of each group is determined through a request for the semantic label to a user with respect to each group and reception of an input. Furthermore, according to an embodiment, among a plurality of places of one group, such as, a place where "a total accumulated number of visits for a predetermined period of time is largest" or a place for which "a total accumulated hour of visits for a predetermined period of time is long" is selected as a representative place of this group. Then, a semantic label of the representative place is requested of the user. As a result, the semantic label that the user has manually input is set as a semantic label of the representative place. Then, the semantic label of the representative place is defined as the semantic label of the group. Subsequently, the semantic label of the group is defined as the semantic label of the rest of the places, except the representative place within the group.

In an exemplary embodiment, once the location of the user is detected, the apparatus detects or determines whether the detected location corresponds to a pre-stored place. In response to the determination that the detected location corresponds to the pre-stored place, the semantic label of the corresponded pre-stored place is considered the semantic label of the detected location. Otherwise, in response to the determination that the detected location does not correspond to the pre-stored place, the detected location is identified as a new place, and whether attributes of the new place are similar to the attributes of the pre-stored places are determined. In response to finding that the pre-stored place has similar attributes, a semantic label of the pre-stored place with similar attributes is considered the semantic label of the new place. In response to finding that the pre-stored place has similar attributes but the semantic label has not been set, the new place is determined to be added as a new member to a group of the found pre-stored place. If the pre-stored place with the similar attributes is not found, the new place is determined to be a member of the new group. Afterwards, if members of a group with a semantic label that has not been set increase enough, the semantic labels of the places within the group is determined through a user request for the semantic label of this group.

The more location data of the user is accumulated, the more reliable a semantic labeling produced by the apparatus and method thereof will be, according to an exemplary embodiment. In accordance with an alternative configuration, in situations where the user graduates from a school, moves to another area, or transfers to another workplace in another area, the behavior pattern of may rapidly changed and the pre-stored semantic labels would need to be reset. In such a case, even though the user visits a place whose semantic label has not been set yet, the semantic label of the place currently being visited may be automatically estimated based on the semantic labels stored in advance, according to exemplary embodiments.

Hereinafter, a semantic labeling system and method is described referring to FIGS. 1 to 18 as exemplary embodiments.

FIG. 1 is a diagram illustrating an example of an environment for a location-based service (LBS) where exemplary embodiments are applied.

Referring to FIG. 1, a mobile device 13 detects a location of a user 11. The mobile device 13 receives a cell ID or GPS coordinates from a mobile phone base station 15 or a GPS satellite 17 to detect the location of the user 11. The detected location of the user 11 corresponds to one of places A, B, C, and D whose semantic labels are defined by a semantic labeling performed by a semantic labeling apparatus and method thereof, in accordance with an embodiment. As illustrated in FIG. 1, the location of the user corresponds to a place B, which is determined to be a semantic label of the current location of the user. The semantic labeling apparatus and method in the mobile device 13 perform the semantic labeling of the user location, according to an exemplary embodiment. As a result, in response to the semantic label being determined, a service is provided by an LBS module built in the mobile device 13. The semantic label of the user location is transmitted from the mobile device 13 to an LBS server 19, and a related service is provided from the LBS server 19 to the mobile device 13.

The exemplary embodiment illustrated in FIG. 1 is only one example and is not intended to limit exemplary embodiments. For example, the semantic labeling apparatus performing the semantic labeling, according to an exemplary embodiment, may be executed or performed at a remote labeling server. In such a case, the mobile device 13 provides collected information related to the location of the user to a labeling server over communication networks. The labeling server determines the semantic label of the location of the user, according to exemplary embodiments, and transmits the determined semantic label to the mobile device 13. The labeling server is integrated with the LBS server 19, determines the semantic label of the user's location, and transmits the LBS information according to the determined semantic label to the mobile device 13, as illustrated in FIG. 1.

Hereinafter, exemplary embodiments of a semantic labeling system are described with reference to FIGS. 2 to 13. The semantic labeling systems described with reference to FIGS. 2 to 13 are only examples. Components of the semantic labeling apparatus are implemented by hardware including circuits that implement each function.

Figure 2:
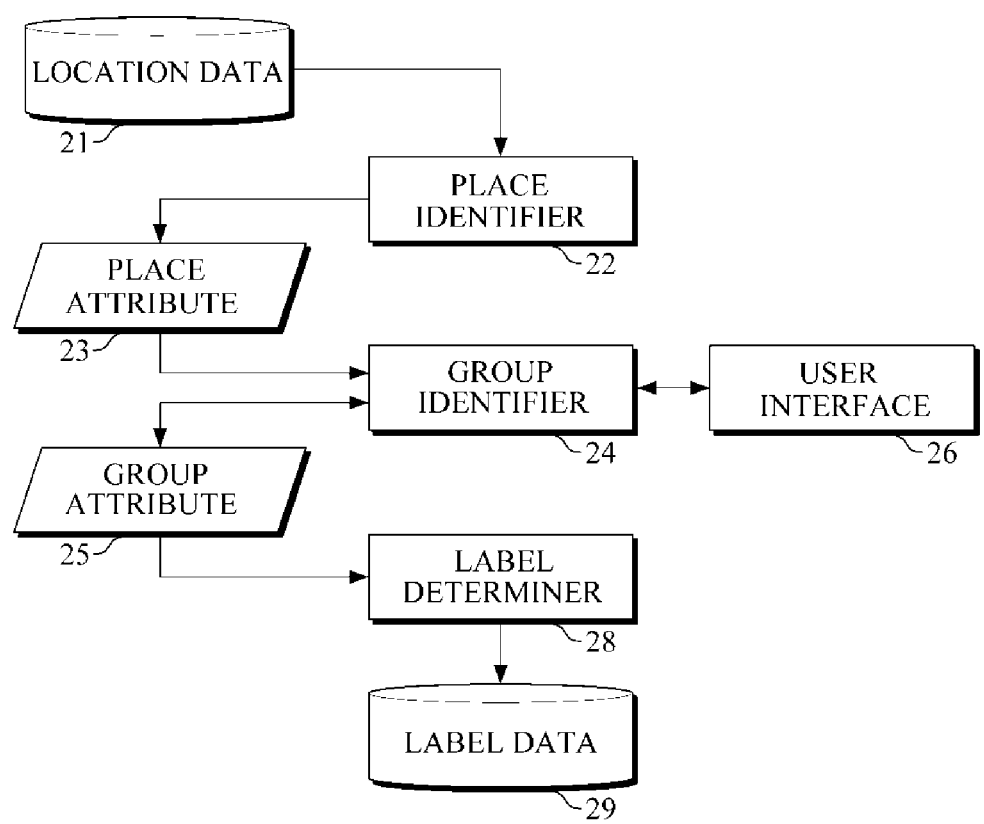
FIG. 2 is a diagram illustrating a composition of a semantic labeling apparatus, according to an exemplary embodiment.

With reference to FIG. 2, a diagram shows a composition of a semantic labeling apparatus, according to an exemplary embodiment. As illustrated in FIG. 2, a semantic labeling apparatus 20 is an apparatus that calculates data from location data 21 to detect a location of the user, to label data 29 that includes a semantic label indicating a significance of a specific location with regard to the user. To this end, the semantic labeling apparatus 20 includes components, such as a place identifier 22, a group identifier 24, a user interface 26, and a label determiner 26.

The place identifier 22 is a component that identifies a place from the location data 21. The location data 21 includes data related to the location of the user. The location data 21 is detected and generated by sensors built in mobile devices, such as a smartphone, a smart watch, and smart glasses. The location data 21 includes geographical coordinates detected in a predetermined unit of time, e.g., GPS coordinates and a cell ID. The place identifier 22 monitors a time-based change of the location of the user (such as, geographical coordinates) detectable from the location data 21. If the location of the user is found as remaining within a predetermined area for a predetermined period of time, the area is identified as a place having an important significance for the user.

For example, if the location of the user remains at a specific cell ID for a predetermined period of time when being displayed with a cell ID, the place identifier 22 identifies, as a meaningful place to the user, an area that the specific cell ID covers. In another example, if the location of the user remains for a predetermined period of time at a specific area within a predetermined radius when being displayed with GPS coordinates, the specific area is identified as a place meaningful to the user. A unique identification number (such as, a place ID) is allocated to the identified place by the place identifier 22. The place ID is sufficient with information used for the simple identification in contrast to a semantic label of the user and, accordingly, is composed of a combination of numbers.

The identified place is related to attribute information, which includes information related to a visit from the user to a place. Related to the visit of the user to the place, the time when the user enters and leaves from the place is notified. Such entering and leaving time may be notified because of the time the location of the user is detected. A length of time between the entering time and the leaving time of the user with respect to the specific place is notified as the time data. The length of time is stored as visit duration. In addition, the number of visits is counted in each different time period. Accordingly, the accumulated number of visits and the accumulated visit duration, for example, for a day or a month are calculated. Such information is included in place attributes 23 generated by the place identifier 22.

The group identifier 24 is a component that classifies and clusters places identified by the place identifier 22. The classification of the places is based on the attributes of the place. The group identifier 24 compares attributes related to each place ID with each other and classifies the place ID with similar attributes into one group. A standard of determining which attributes to be similar is based on common individuals' behavior patterns. For example, based on the fact that people generally follow a pattern of "sleeping at home at night and engaging in activity at school or a workplace in the daytime", places where the user stays at night or in the daytime during a specific time period is determined to have similar attributes to each other. Furthermore, based on the fact that people generally follow a pattern of "engaging in hobbies, such as doing exercise in a predetermined time period every day or every week", places where the user relatively-fewer-times but regularly visits at breakfast, lunch, and dinner time or in a predetermined time period on weekends is determined to have similar attributes.

In such a manner, the group identifier 24 performs clustering into one or more groups. The group ID is allocated to each group for the group identifier 24 to uniquely identify each group. It is enough for the group ID to include information with a combination of numbers for simple identification in the same manner as the place ID, in contrast to a semantic label of the user. The attribute information is related to each group as well. The attribute information of the group includes information on the group ID and group membership of each group. The information on the group membership includes the place IDs of member places of the group, and places profile information related to each place ID.

The group identifier 24 requests a semantic label from the user with respect to each clustered group. The request is provided to the user through the user interface 26, and the user inputs a desired semantic label through the user interface 26 to designate the semantic label for each group.

The user interface 26 is, for example, visually provided on a display of a smartphone. For example, the user interface 26 includes the entire member places of the requested group or geographical location information and attribute information of one representative place. In addition, the user interface 26 includes a list of the semantic labels that the user is able to select. The user is enabled to select, with respect to the requested group, a semantic label that is thought to be the most suitable for the user, on a list of the displayed semantic labels, to designate the semantic label for the group. Alternatively, the user responds to the request by freely writing the desired semantic label on the user interface 26 in a form of a word, a phrase, or a sentence, and designates the semantic label of the group.

In an exemplary embodiment, there is no significance in practice in how the user composes the semantic label by using any specific word, because the significance in practice depends on the similarities of the attributes of the places included in the same group. The determination as to whether different places are included in the same group or divided into different groups are made according to similarities of the attributes of the places. Thus, the user does not have to compose the semantic label by using only words determined by a system. Rather, provided is the convenience to the user who is enabled to freely express the semantic label with the content that the user desires, according to an exemplary embodiment.

The semantic label designated by being selected or written by the user is transferred to the group identifier 24 through the user interface 26. The group identifier 24 determines the semantic label designated by the user as the semantic label of the relevant group. The group identifier 24 generates group attributes 25 that may include information on the group ID and the group membership of each group and also further includes group label information in a case where the user designates the semantic label.

A label determiner 28 is a component that determines a semantic label of the respective place. The label determiner 28 reviews the group attributes 25 and determines the semantic label of the respective place. That is, in the group attributes 25, in terms of a group including, as a group label, the semantic label designated by the user, the label determiner 28 determines the semantic label for all places that would be included as the member in the future and the current member places included in the group. The label determiner 28 generates label data 29 that includes information related to respective places with designated semantic label, respectively.

As described above, the semantic labeling apparatus 20 identifies, from location data, places where the user visits. Then, the semantic labeling apparatus 20 clusters the identified places, generates the groups according to the similarities between the places, requests a semantic label with respect to the generated group from the user, and enables the user to designate the semantic label. Then, the semantic labeling apparatus 20 processes the semantic label designated with respect to the group as a semantic label of member places within the group to determine the semantic label of the respective places. In such an example, the importance of the respective places originates from a fact that the user stays for more than a predetermined period of time at the relevant place. In addition, the association between the respective places and the group may be guaranteed by similarities of the attributes, such as a time period when the user has visited the relevant places.

The various identifiers, attributes, determiner, and interface described above may be implemented using one or more hardware components or a combination of one or more hardware components. A hardware component may be, for example, a physical device that physically performs one or more operations, but is not limited thereto. Examples of hardware components include processor, controller, server, or other similar hardware components.

Figure 3:
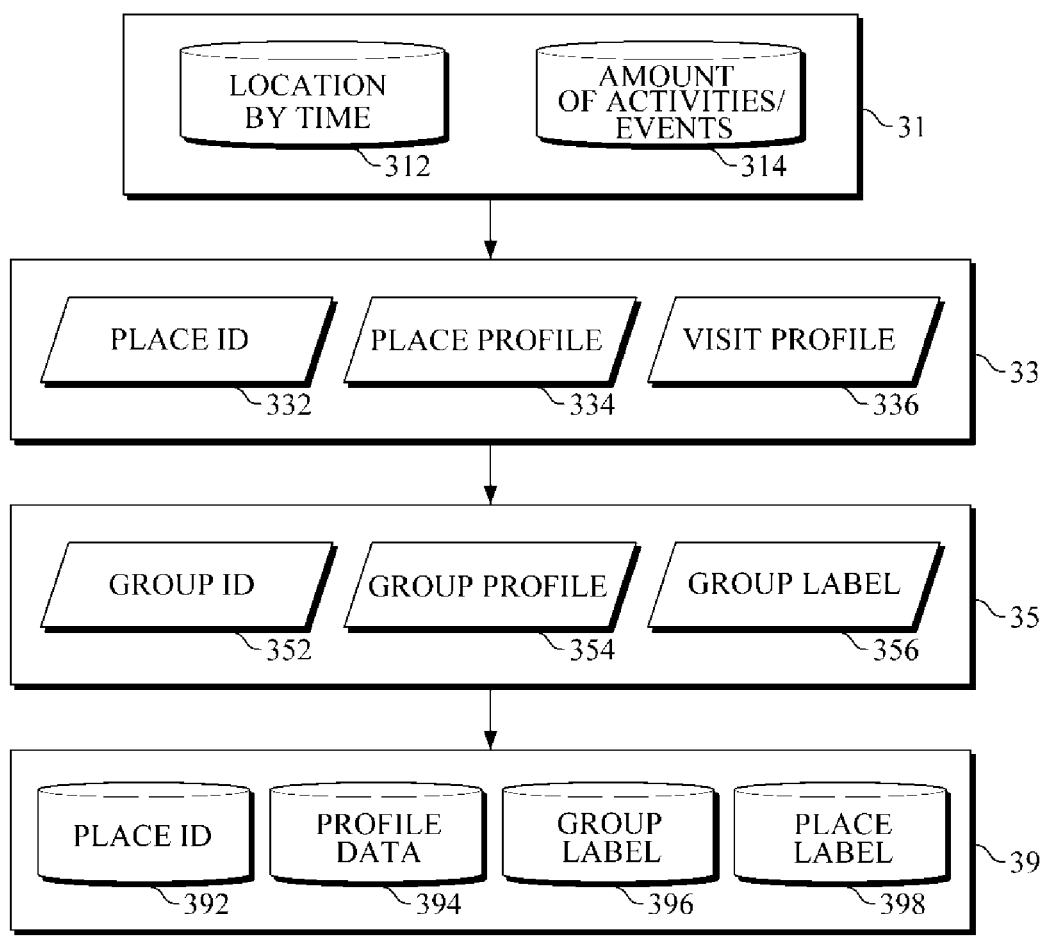
FIG. 3 is a diagram illustrating an example of a process from location data to final label data in the semantic labeling apparatus, according to an exemplary embodiment.

FIG. 3 is a diagram illustrating an example of a process from location data to final label data in a semantic labeling apparatus, according to an exemplary embodiment. FIG. 3 shows only data after omitting components of the semantic labeling system. Initial location data 31 is converted into place attributes 33 by a place identifier. The place attributes 33 are converted into group attributes 35 by a group identifier. The group attributes 35 are finally converted into label data 39 by a label determiner.

The location data 31 is detection data that has been detected by a sensor. The location data 31 includes location-by-time data 312 and/or an amount-of-activities/events data 314. The location-by-time data 312 is, for example, two-dimensional geographical coordinates that are acquired by a GPS coordinates detecting sensor or a cell ID coordinates detecting sensor. The amount-of-activities/events data 314 includes, but it is not limited to, data that indicates the behavior of the user related to each location included in the location-by-time data 312. For example, the amount of activities of the user that is recorded by a motion sensor is used to identify various actions, such as whether the user is walking, at a standing position, running, or moving in car. In a case where the user is using a smartphone, the actions of the user are identified through the detection of events, such as operating a specific application, talking on phone, or sending/receiving messages.

In an exemplary embodiment, the location-by-time data 312 detects the place or location is detected and generates the attributes of the place. The amount-of-activities/events data 314 is used as the data to identify the user behavior at a specific place. The user behavior at the specific place supplements information on the attributes of the place.

The place attributes 33 generated from the location data 31 includes a place ID 332, a place profile 334, and a visit profile 336. The place ID 332 is identification information to uniquely distinguish each place, which may be made with a combination of numbers and/or words. In a case where the location of the user remains unchanged for a predetermined period of time within a predetermined area, such a predetermined area is identified as a place. Thus, the place cannot be identified in an area where the user location is not detected.

The place profile 334 are attributes that indicate geographical information of each of the places identified by the place ID 332. For example, the place profile 334 includes center coordinates and radius of the place identified by an arbitrary place ID. The center coordinates may be expressed in various manners, such as GPS coordinates, a cell ID, a mobile base station ID, and a Wi-Fi® access point. The radius is represented as a unit of measurement including, but not limited to, centimeters, meters, kilometers, inches, feet, or miles.

The visit profile 336 includes user visit history information related to each of the places identified by the place ID. The visit history information, for example, includes a visit start/end time, visit duration, a visit day, and visit day. The visit history information is generated based on the location-by-time data 312 of the location data 31. The visit profile 336 includes user behavior information related to each of the places identified by the place ID. The user behavior information includes, for example, an application type of the operating mobile device, the number/duration of callings, the number of Short Message Service (SMS) messages sent/received, and/or actions of the user as walking/stopping/moving by car. The user behavior information is generated based on the amount-of-activities/events data 314 of the location data 31. The visit profile 336 includes accumulated visit information related to each of the places identified by the place ID. The accumulated visit information includes, but it is not limited to, the entire number of visits for a day/week/month, the duration of all the visits, or an average duration for one visit. The accumulated visit information is generated based on the visit history information of the location data 31. Furthermore, the accumulated data of the user behavior information is generated.

The group attributes 35 generated from the place attributes 33 includes a group ID 352, a group profile 354, and a group label 356. The group ID 352 is identification information that enables each group to be uniquely distinguished. The group ID 352 is configured with a combination of numbers and/or words. Each group includes one or more places as members. Each group includes at least one place with similar attributes.

The group profile 354 includes the place IDs of member places included in each of the groups identified by the group ID, and similar or common attribute information of the member places.

The group label 356 indicates a semantic label designated by a user with respect to each group. The user designates the semantic label of the group based on the similar attribute information of the group member places included in the group profile 354. Alternatively, the user designates the semantic label only with respect to one representative place selected from the group, and the semantic label of such a representative place is treated as the semantic label of the group.

The label data 39 generated from the group attributes 35 includes the place attributes 33 and the group attributes 35. In a configuration, the label data 39 also includes a place label 398 that defines the semantic label with respect to each place. As illustrated in FIG. 3, the label data 39 includes a place ID 392, profile data 394, a group label 396, and a place label 398.

Of the group attributes 35, the place ID 392 may be the same as the place ID 332 included in the place attributes 33. The profile data 394 includes all the place profile 334, the visit profile 336, and the group profile 354. The group label 394 may be the same as the group label 356 of the group attributes 35.

The place label 398 includes semantic label information of each place identified by the place ID. The semantic label of each place is determined by treating the group label 356 of the group attributes 35 as the semantic label of each of the member places within the relevant group.

In an exemplary embodiment, in a case where the user visits a new place that has not been visited previously, the semantic label of the new place is estimated according to attributes of the new place, that is, representing the user visit history and/or the user behavior. In other words, in a case where the attributes of the new place are compared to attributes of the places stored in advance within the label data 39, and in a case where the places or the groups of the similar attributes are discovered, the semantic label of the place or the group are treated as a semantic label of the new place.

Figure 4:
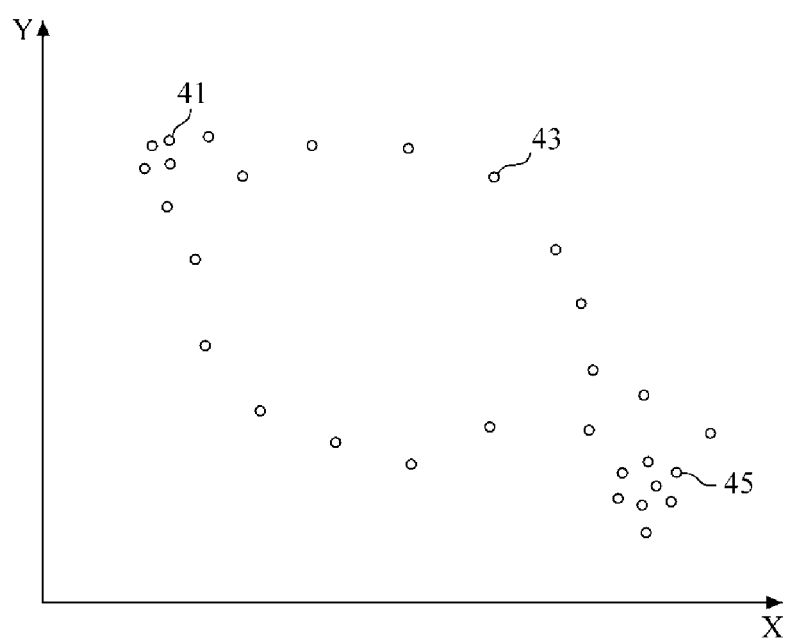
FIG. 4 is a diagram illustrating an example of location data indicating a location of a user detected at a sensor in the semantic labeling apparatus, according to an exemplary embodiment.

FIG. 4 is a diagram illustrating an example of location data indicating the location of the user detected by a sensor in a semantic labeling apparatus, according to an exemplary embodiment. FIG. 4 shows the distribution of locations of users 41, 43, and 45 detected within two-dimensional geographical coordinates as illustrated with an X-axis and a Y-axis. The location data 40 illustrated indicates simple location coordinates. However, in response to the location being combined with detected time point data, the semantic labeling apparatus determines that the location of the user 41 and corresponding surroundings on the top left of the coordinates is a place where the user has visited and stayed from evening until morning, that the location of the user 45 and corresponding surroundings on the bottom right of the coordinates is a place where the user has visited and stayed from morning until evening, and that the location of the user 43 in the middle is a place where the user has visited and stayed only for a short period in the evening.

Figure 5:
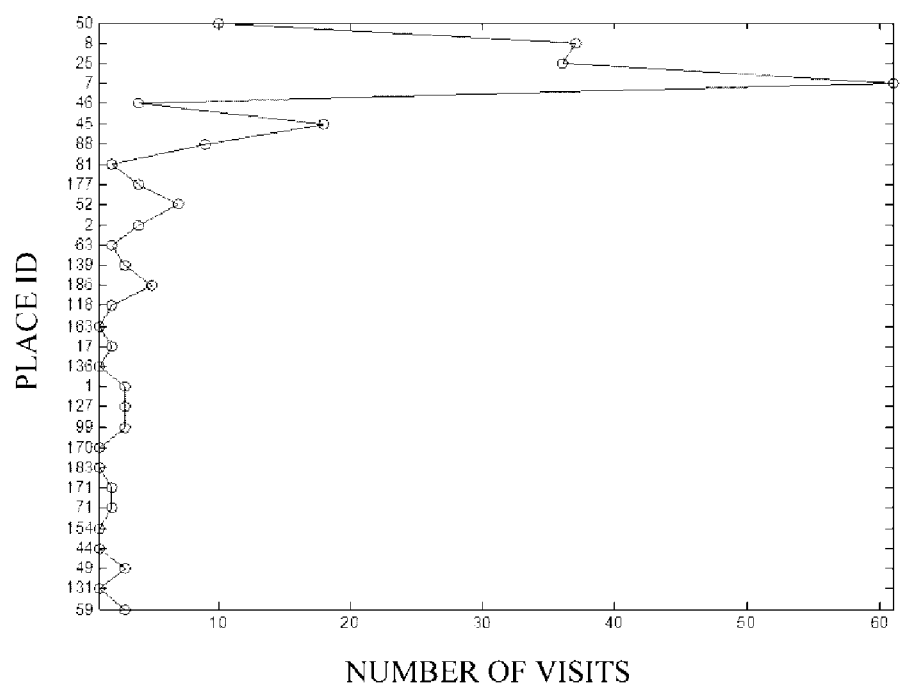
FIG. 5 is a graph illustrating an example of data indicative of an accumulated number of visits to each place the user has visited in the semantic labeling apparatus, according to an exemplary embodiment.

FIGS. 5 to 9 illustrate examples of visit history information, which is made after processing a visit history of the user with respect to places identified using a place identifier (ID) in a semantic labeling apparatus, according to exemplary embodiments FIG. 5 is a graph illustrating an example of data 50 on the accumulated number of visits to each place a user has visited in a semantic labeling apparatus, according to an exemplary embodiment. In FIG. 5, each of the numbers marked on a vertical axis indicates a place ID of a specific place, and each of the numbers marked on a horizontal axis indicates the number of visits to the specific place where the user has visited for a predetermined period of time. As illustrated in FIG. 5, in a direction from the top to the bottom of the graph, it is shown that the user has visited a place No. 50 ten times, a place No. 8 thirty-seven times, a place No. 25 thirty-five 35 times, and a place No. 7 sixty-two times. Using the graph of FIG. 5, one can appreciate that the place with the high number of visits and the place with the low number of visits are distinguished from each other. Places with the similar number of visits are clustered into the same group.

Figure 6:
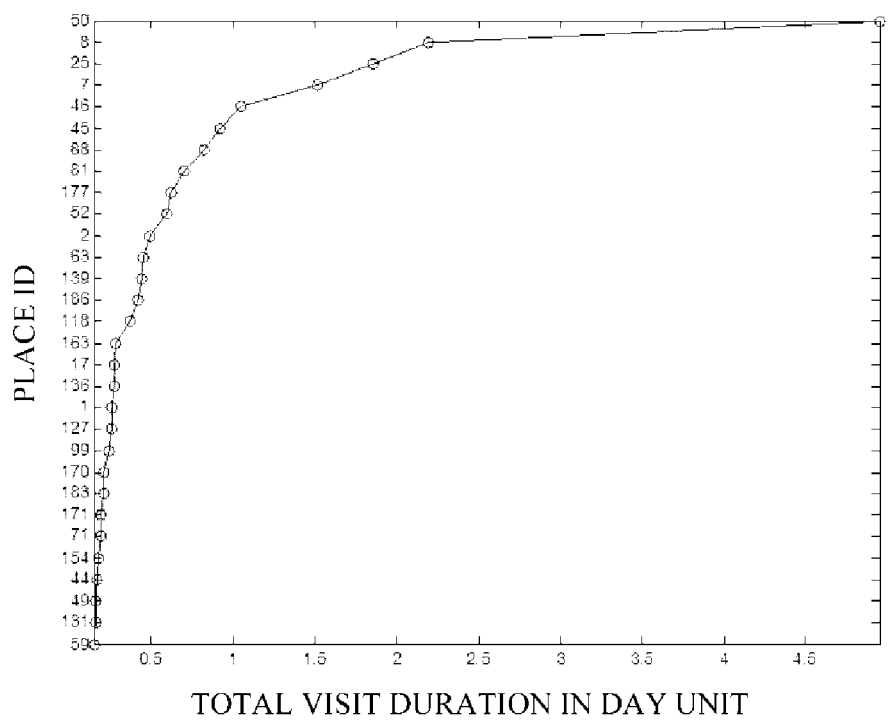
FIG. 6 is a graph illustrating an example of data indicative of an accumulated duration for each user visit to a place in the semantic labeling apparatus, according to an exemplary embodiment.

FIG. 6 is a graph illustrating an example of data 60 on the accumulated duration for each visit to a place by the user in a semantic labeling apparatus, according to an exemplary embodiment. In FIG. 6, each of the numbers marked on the vertical axis indicates a place ID of a specific place, and each of numbers marked on a horizontal axis indicates an accumulated duration a user visited and stayed at the specific place in a day. In FIG. 6, in a direction from the top to the bottom of the graph, one can appreciate that the user has stayed at a place No. 50 for approximately five hours, a place No. 8 for approximately two hours ten minutes, a place No. 25 for approximately one hour and fifty minutes, and a place No. 7 for approximately one hour and a half, during a period 24 hours. Through the graph of FIG. 6, it may be easily known that the place with the long visit duration and the place with the short visit duration are distinguished from each other, and places with the similar visit duration are clustered into the same group.

Figure 7:
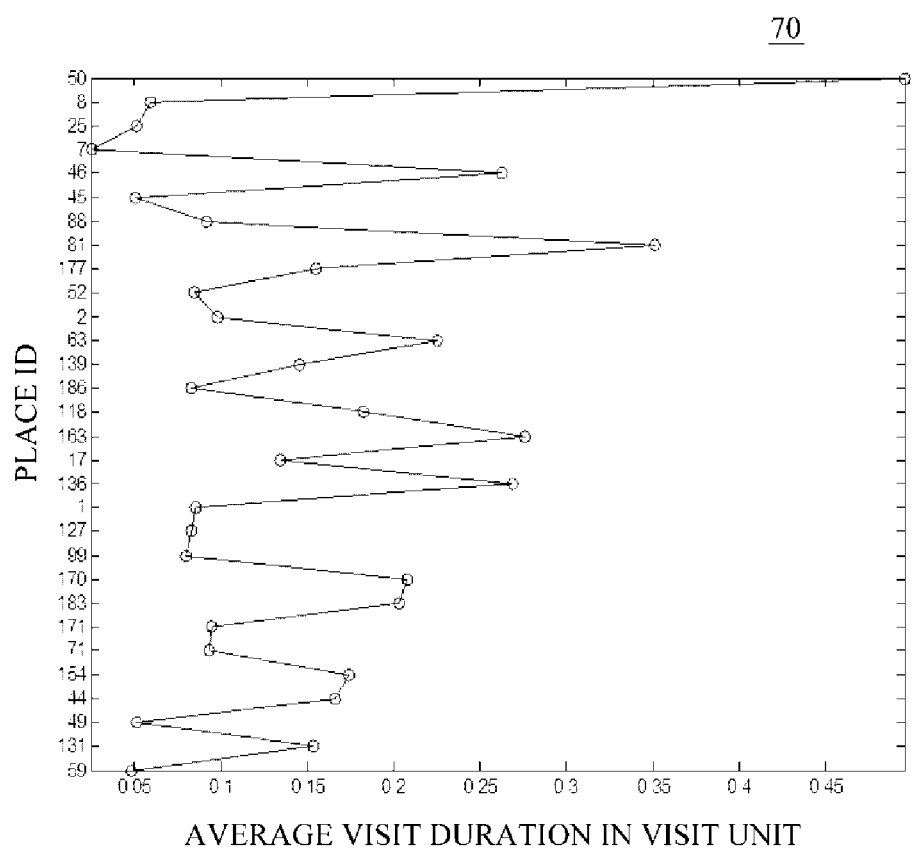
FIG. 7 is a graph illustrating an example of data indicative of average time duration a user visiting each place in a semantic labeling apparatus, according to an exemplary embodiment.

FIG. 7 is a graph illustrating an example of data 70 on an average duration a user visits each place in a semantic labeling apparatus, according to an exemplary embodiment. In FIG. 7, each of the numbers marked on a vertical axis indicates a place ID of a specific place, and each of the numbers marked on a horizontal axis indicates an average duration in one day unit of one visit to the specific place. In FIG. 7 illustrated, in a direction from the top to the bottom of the graph, it may be known that the user has stayed, for each visit on average, at a place No. 50 for half a day, at a place No. 8 for approximately 0.06 day, at a place No. 25 for approximately 0.05 day, and at a place No. 7 for approximately 0.001 day. Through the graph of FIG. 7, one can appreciate that the place with the long average visit duration and the place with the short average visit duration are distinguished from each other, and the places with the similar average visit duration are clustered into the same group.

Figure 8:
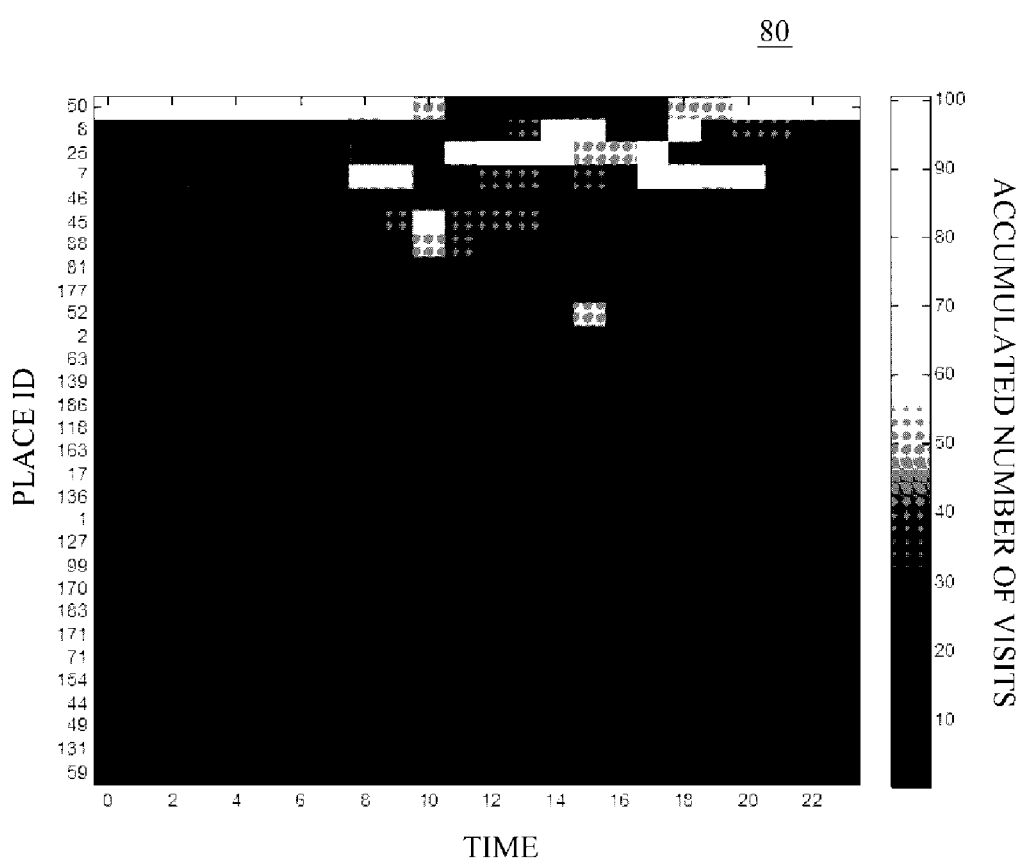
FIG. 8 is a graph illustrating an example of data indicative of the accumulated number of visits during each time period the user visits each place in a day in a semantic labeling apparatus, according to an exemplary embodiment.

FIG. 8 is a graph illustrating an example of data 80 on the accumulated number of visits for each time period a user visits each place per day in a semantic labeling apparatus, according to an exemplary embodiment. In FIG. 8, each of numbers marked on a vertical axis on the left indicates a place ID of a specific place, and each of numbers marked on a horizontal axis indicates a time period that the user visits the specific place for a day. The degree of darkness of the painted shades indicates the accumulated number of visits, which gets higher as the shades gets closer to white. The white color indicates the maximum number of visits, and black color indicates the minimum number of visits or zero number of visits. In a direction from the top to the bottom of the graph, it may be known that the user has often stayed at a place No. 50 for a period of 0 o'clock to 10 o'clock and for a period of 20 o'clock to 24 o'clock in a day. Through the graph of FIG. 8, a person of ordinary skill in the art can appreciate that places with the similar time period of visits in a day are distinguished from each other, and are clustered into the same group.

Figure 9:
FIG. 9 is a graph illustrating an example of data on the accumulated number of visits for each day the user visits each place in a week in a semantic labeling apparatus, according to an exemplary embodiment.

FIG. 9 is a graph illustrating an example of data 90 on the accumulated number of visits for each day the user visits each place in a week in a semantic labeling apparatus, according to an exemplary embodiment. In FIG. 9, each of numbers marked on a vertical axis on the left indicates a place ID, and each of numbers marked on a horizontal axis indicates a day the user visits a specific place. The darkness of the painted shades indicates the accumulated number of visits, which gets higher as the shades gets closer to white. The white color indicates the maximum number of visits, and black color indicates the minimum number of visits or zero number of visits. In a direction from the top to the bottom of the graph, a person of ordinary skill in the art can appreciate that the user has visited a place No. 50 the most on Sunday and Saturday in a week and rarely on Monday and Wednesday. Through the graph of FIG. 9, a person of ordinary skill in the art can appreciate that places with the similar days of visits are distinguished from each other and are clustered into the same group.

As described above with reference to FIGS. 5 to 9, the attributes of user visiting places are generated based on location data that indicates a simple location-by-time of the user. Nevertheless, various attributes regarding the places are generated, which enables each of the different places to be clustered into groups with similar attributes. Thus, although the user does not manually designate a semantic label for all of the places the user visited, the proper semantic label is defined with respect to all of the places the user visited. Furthermore, even for a user visiting place that has not been previously defined but newly detected, a proper semantic label is defined without a user's intervention.

Figure 10:
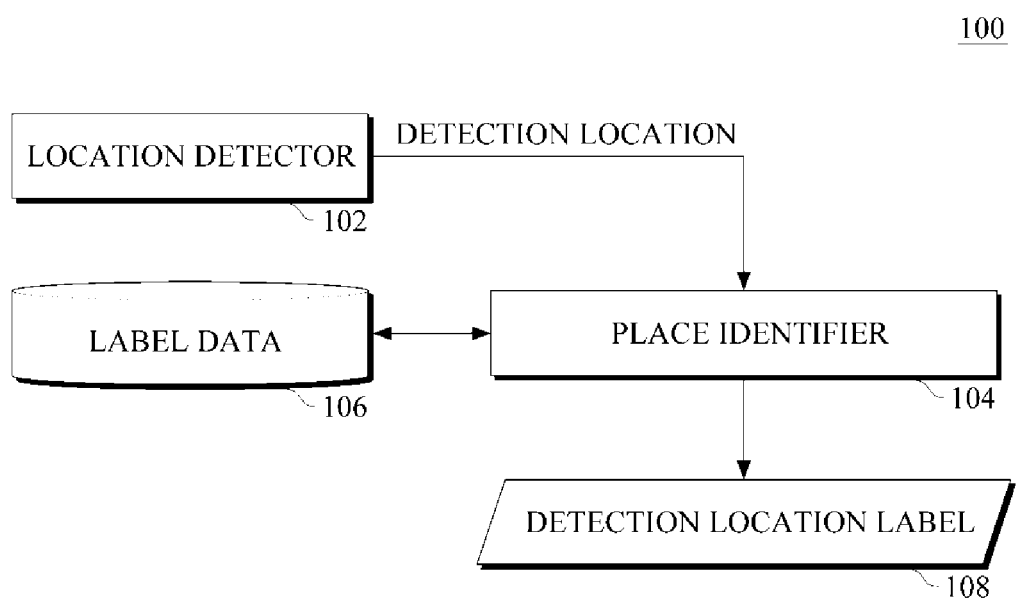
FIG. 10 is a diagram illustrating an example of determining a label at a detected location as a label of a similar place stored in advance performed in a semantic labeling apparatus, according to an exemplary embodiment.

FIG. 10 is a diagram illustrating an example of determining a label at a detected location as a label of a similar place stored in advance performed in a semantic labeling apparatus, according to an exemplary embodiment. In a semantic labeling apparatus 100, when a location detector 102 detects a location of the user, the detected location is transmitted to a place identifier 104. The place identifier 104 identifies a place corresponding to the detected location and compares the corresponding place to places stored within label data 106. After the comparison, in response to the detected location being the same as one of the stored places, the place identifier 104 outputs a semantic label of the same place as a detected location label 108, which indicates a semantic label of a currently detected location. The place identifier 104 updates related information, such as a visit profile of this place. In contrast, in response to the detected location not being the same as any one of the stored places, the place identifier 104 registers the place corresponding to the detected location as a new place. The newly registered place includes a place ID to be allocated, place attributes to be generated, and a new semantic label to be designated based on the place attributes, in the same manner as described with reference to FIG. 2.

Figure 11:
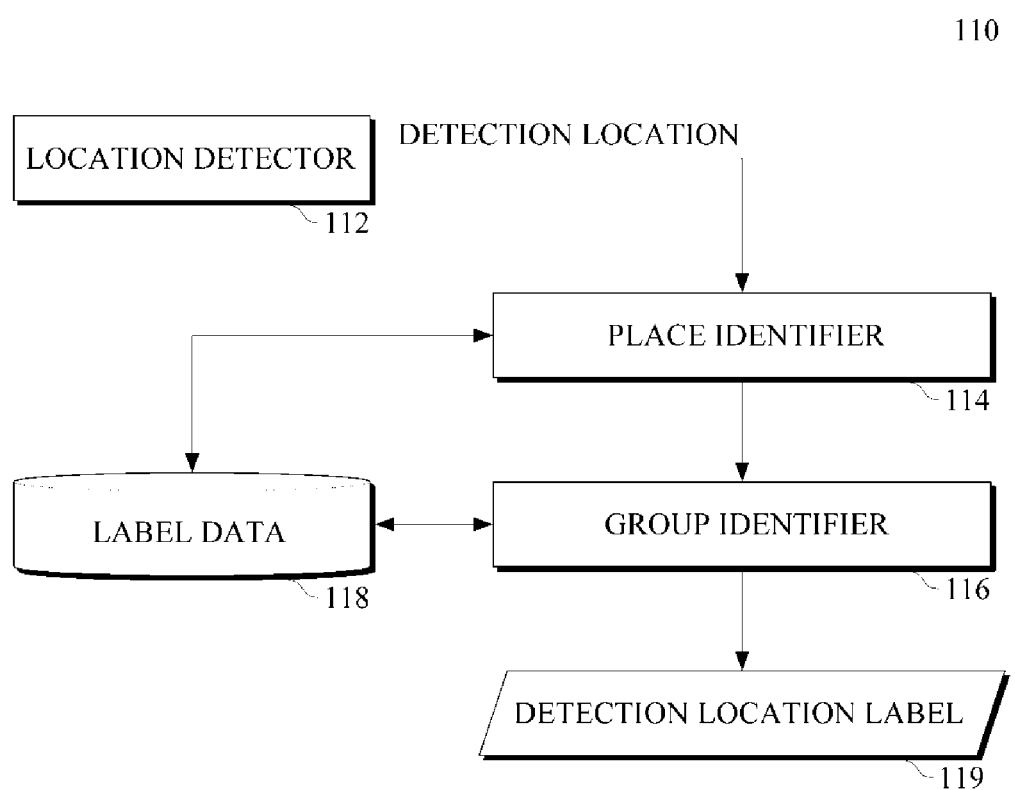
FIG. 11 is a diagram illustrating an example of determining a label at a detected location as a label of a similar group stored in advance performed in a semantic labeling apparatus, according to an exemplary embodiment.

FIG. 11 is a diagram illustrating an example of determining a label at a detected location as a label of a similar group stored in advance performed in a semantic labeling apparatus, according to an exemplary embodiment. In a semantic labeling apparatus 110, when a location detector 112 detects a location of the user, a place identifier 114 identifies a place corresponding to the detected location and compares the corresponding place with places stored within label data 118. After the comparison, in response to the detected location not being the same as any of the stored places, the place identifier 114 allocates a new place ID with respect to the place corresponding to the detected location and generates corresponding place attribute information.

Then, a group identifier 116 compares place attributes of a new place with attributes of the places stored within the label data 118. After the comparison, in a case where the attributes of the new place are the same as or similar to any one of the attributes of the places where the attributes of the new place are stored, the group identifier 116 enables the new place to belong to, correspond to, or be associated with a group in which the place with the same or similar attributes is included. The group identifier 116 outputs a semantic label of this group as a detected location label 119 that indicates a semantic label of a currently detected location. The group identifier 116 updates related information, such as a group profile, of this group. In contrast, in a case where the attributes of the new place are not the same as or similar to any one of the stored places, the group identifier 116 registers a new group that has the new place as a member. The newly registered group includes a new semantic label designated by a user, for example, in the same manner as described with reference to FIG. 2.

Figure 12:
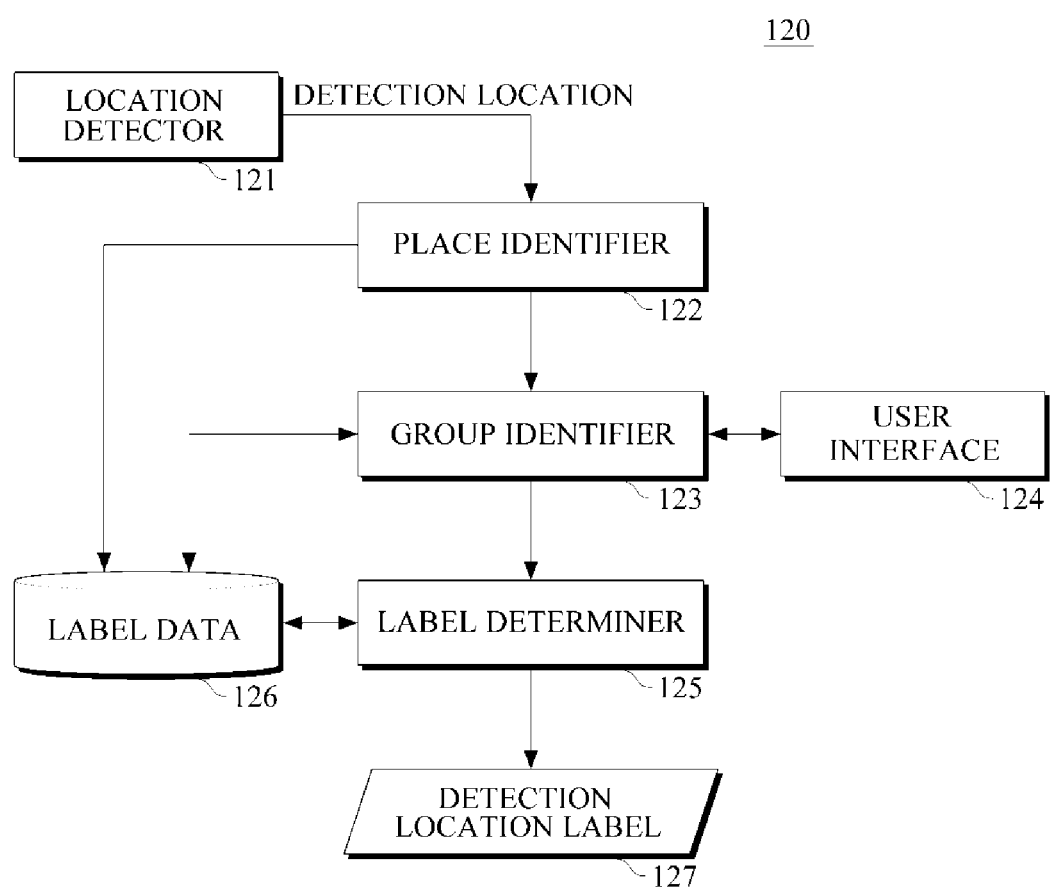
FIG. 12 is a diagram illustrating an example of determining a label at a detected location as a new label performed in a semantic labeling apparatus, according to an exemplary embodiment.

FIG. 12 is a diagram illustrating an example of determining a label at a detected location as a new label performed in a semantic labeling apparatus, according to an exemplary embodiment. In a semantic label system 120, when a location detector 121 detects a location of the user, a place identifier 122 identifies a place corresponding to the detected location and compares the corresponding place with places stored within label data 126. After the comparison, in a case where the detected location is not the same as any one of the stored places, a place identifier 122 allocates a new place identifier with respect to the place corresponding to the detected location and generate corresponding attribute information.

Then, a group identifier 123 compares the attributes of the new place with the place attributes of the places stored within the label data 126. After the comparison, in a case where the attributes of the new place are not the same as or similar to any one of the attributes of the places where the attributes of the new place are stored, the group identifier 123 generates a new group including the new place as a corresponding member, allocate a new group ID, and generates associated group attribute information. Through a user interface 124, the group identifier 123 requests a user to designate a semantic label for the new group. If the user designates the semantic label of the new group, the label determiner 125 outputs the semantic label of the new group as a detected location label 127 that indicates a semantic label of a currently detected location.

Figure 13:
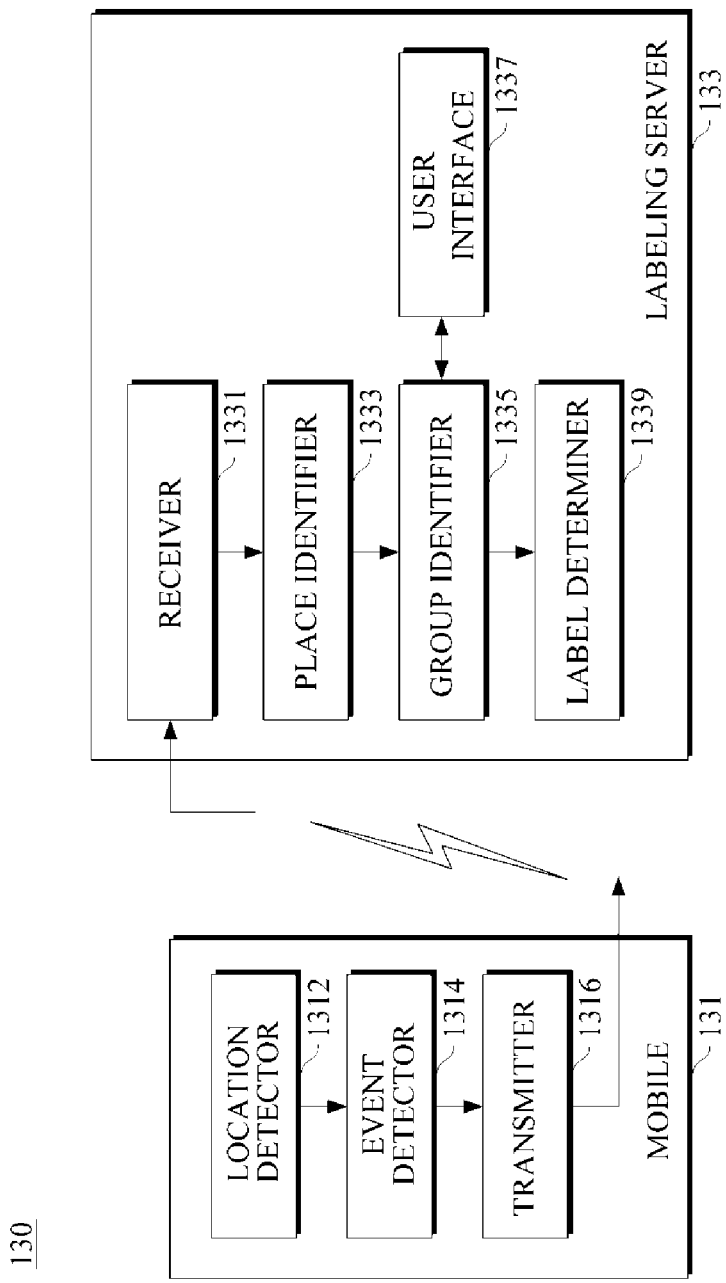
FIG. 13 is a diagram illustrating an example of performing, in a remote server, a semantic labeling of data detected by a mobile device, in accordance with an exemplary embodiment.

FIG. 13 is a diagram illustrating an example of performing, in a remote server, a semantic labeling of data detected by a mobile device, in accordance with an exemplary embodiment. As illustrated in FIG. 13, a mobile device 131 and a labeling server 133 are connected to each other via communications networks, such as wireless internet. The mobile device 131 is a computing device that the user carries or wears and is in charge of detecting a location of the user. The labeling server 133 includes components to perform a semantic labeling technique described above with reference to FIG. 2.

The mobile device 131 includes components, such as a location detector 1312, an event detector 1314, and a transmitter 1316. The location detector 1312 detects the location of the mobile device 131 at a predetermined time point, such as a GPS sensor or a cell ID detector. In one example, the location of the mobile device 131 is the location of the user carrying or wearing the mobile device 131. The event detector 1314 is a component that detects events, such as an operation/end of an application executed by the mobile device 131, a call outgoing/incoming, and a text message transmission/reception. In addition, the mobile device 131 further includes an acceleration sensor or other similar sensor, which detects movements of the mobile device 131 to detect movements of the user carrying or wearing the mobile device 131. The location value and event data detected at the same time point in the location detector 1312 is transmitted to the labeling server 133 as the detected location data after being converted into a wireless signal through the transmitter 1316.

A receiver 1331 of the labeling server 133 receives the location data from the mobile device 131. As the location data is processed by components, such as a place identifier 1333, a group identifier 1335, a user interface 1337, and a label determiner 1339, the semantic label of the current detected user location is output in the same manner as described with reference to, for example, FIGS. 10 to 12. The output semantic label is associated with a proper service by an LBS server (with reference to the reference numeral 19 in FIG. 1), and the associated service is provided to the mobile device 131.

FIGS. 14 to 18 are diagrams illustrating a semantic labeling method, according to exemplary embodiments. It is to be understood that in the various embodiments, the operations in FIGS. 14 to 18 are performed in the sequence and manner as shown although the order of some operations and the like may be changed without departing from the spirit and scope of the described configurations. In accordance with an illustrative example, a computer program embodied on a non-transitory computer-readable medium may also be provided, encoding instructions to perform at least the method described in FIGS. 14 to 18.

Program instructions to perform a method described in FIGS. 14 to 18, or one or more operations thereof, may be recorded, stored, or fixed in one or more non-transitory computer-readable storage media. The program instructions may be implemented by a computer. For example, the computer may cause a processor to execute the program instructions. The media may include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable recording mediums. Also, functional programs, codes, and code segments for accomplishing the example embodiments disclosed herein may be easily construed by programmers skilled in the art to which the embodiments pertain based on and using the flow diagrams and block diagrams of the figures and their corresponding descriptions as provided herein.

Figure 14:
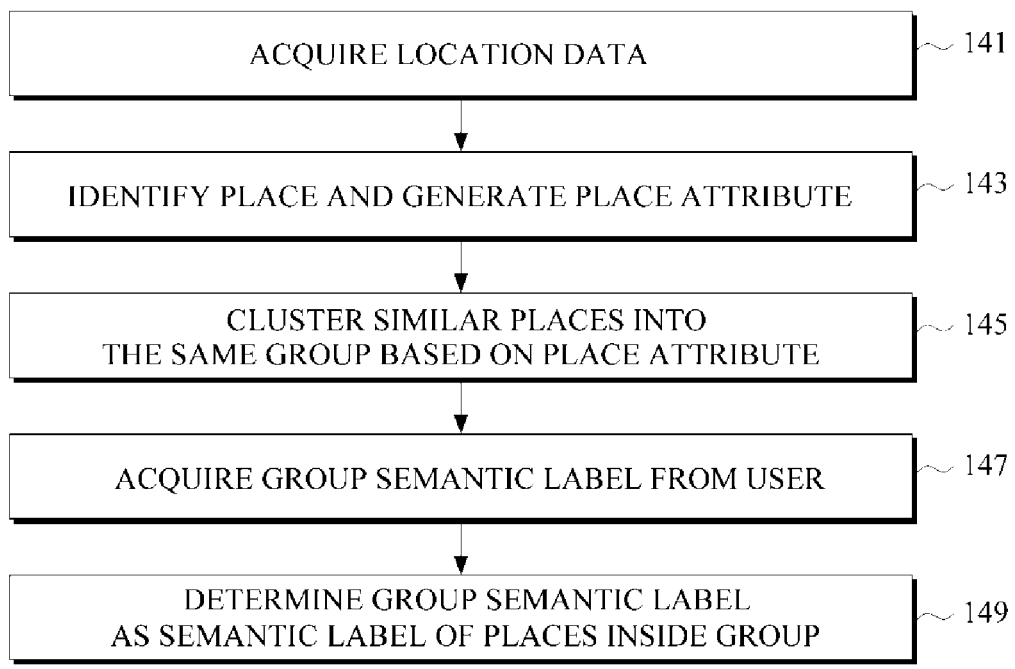
FIG. 14 is a flow chart illustrating a semantic labeling method, according to an exemplary embodiment.

FIG. 14 is a flow chart illustrating a semantic labeling method, according to an exemplary embodiment. The semantic labeling method 140 illustrated in FIG. 14 may be executed in mobile devices, such as a smartphone, a smart watch, or smart glasses, which a user carries or wears, and may be started from, operation 141, in which the method acquires location data, which is related to the location of the user. The location data may include both a location value and a time value. The location value indicates a geographical location, such as GPS coordinates or a cell ID, and the time value indicates the value of the time when the location value is detected.

In operation 143, a place meaningful to the user is identified from the acquired location data. The place is defined in advance as a geographical area of a predetermined size where the location that the user has visited has remained unchanged for more than a predetermined period of time. In other words, in a case where the method detects that the user has stayed for more than a predetermined period of time within an area of a predetermined size, the method identifies the area as a meaningful place in any form to a user. Then, the method a place ID is allocated to the identified place to distinguish the area from the places identified in advance and place attributes may be generated based on related location data with regard to this place. For example, the place attributes may include: the visit time; the visit duration; the visit day, types of applications used, the number or frequency of calls, an SMS usage frequency, and actions, for instance, the user walking, sitting, or running.

At operation 145, the method determines similarities of the places based on the attributes of this place and the places with random similar attributes may be clustered into one same group.

If groups are generated, at operation 147, the method acquires a group semantic label from the user. For example, through a user interface displayed on the display of the mobile device, the user is requested to designate the semantic label with respect to a random group. Then, the user manually designates the group semantic label by selecting or writing the desired semantic label through the user interface on the display of the mobile device. At operation 149, the method considers or determines the semantic label to be a semantic label of member places included in each group so that the semantic label of each place is determined.

Figure 15:
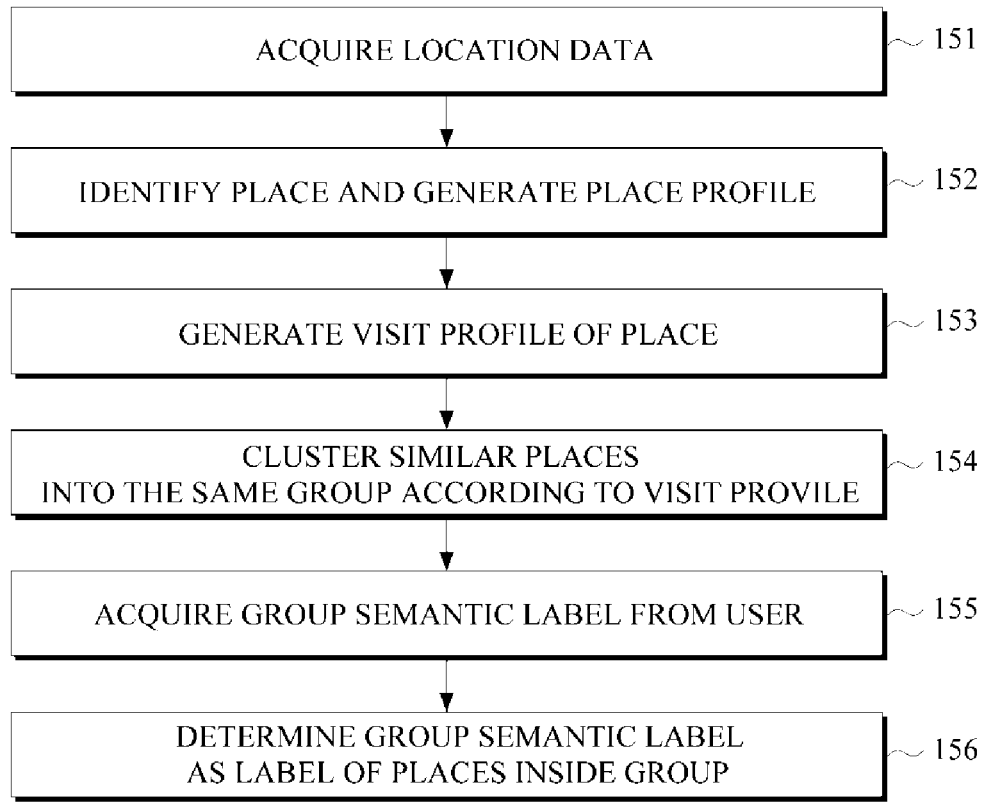
FIG. 15 is a flow chart illustrating a semantic labeling method, according to another exemplary embodiment.

FIG. 15 is a flow chart illustrating a semantic labeling method, according to another exemplary embodiment. A semantic labeling method 150 illustrated in FIG. 5 is first started by acquiring location data in operation 151, which is related to the location of the user.

At operation 152, the method identifies a place meaningful to the user from the acquired location data. A place ID to uniquely identify each place is allocated to the identified place, and a place profile indicating a geographical characteristic of the place is generated. At operation 153, a visit profile may be generated, which includes the visit time, the visit duration, the visit day, types of applications used, the number or frequency of calls, an SMS usage frequency, and actions, for instance, the user walking, sitting, and running.

At operation 154, the method determines similarities of the places based on the visit profile of each place, and clusters places with randomly similar visit profiles into one group. At operation 155, in response to the groups being generated, the method acquires the group semantic label from the user. At operation 156, the method considers or determines the group semantic label to be a semantic label of member places included in each group so that the semantic label of each place is determined.

Figure 16:
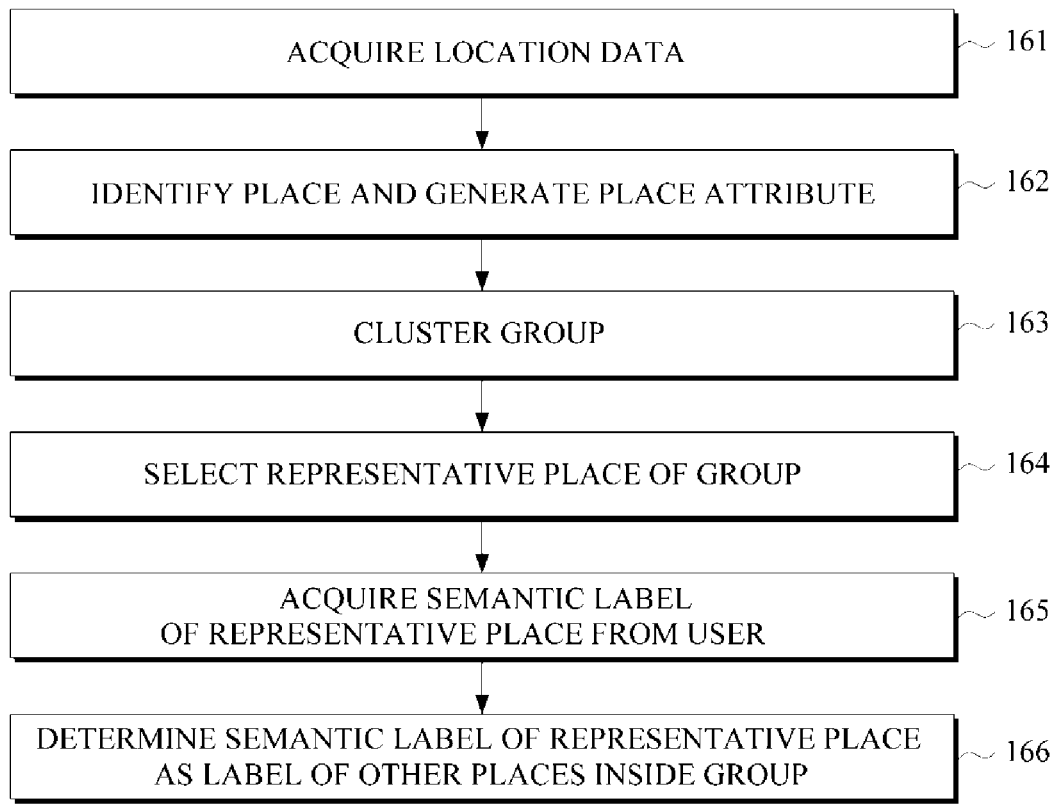
FIG. 16 is a flow chart illustrating a semantic labeling method, according to yet another exemplary embodiment.

FIG. 16 is a flow chart illustrating a semantic labeling method, according to yet another exemplary embodiment. A semantic label method 160 illustrated in FIG. 16 starts at operation 161 by acquiring location data, which is related to a user's location. At operation 162, the method identifies a place meaningful to the user from the acquired location data. A place ID is allocated to the identified place to distinguish the place from the places identified in advance, and place attributes are generated based on related location data with regard to this place. For example, the place attributes include the visit time, the visit duration, the visit day, types of applications used, the number or frequency of calls, an SMS usage frequency, and actions, for instance, the user walking, sitting, or running.

At operation 163, the method determines similarities of the places based on the place attributes, and clusters places with randomly similar attributes into one and the same group.

In operation 164, in response to groups being generated, the method selects one place of group member places as a representative place. The representative place is a place determined to have attributes that indicate the best attributes of each group. For example, among the group member places, the method selects as the representative place a place with the largest number of user visits for a predetermined period of time or the longest user visit duration for a predetermined period of time.

In response to a representative place being selected, at operation 165, the method acquires a group semantic label of the representative place from the user. At operation 166, the method treats or processes the semantic label of the representative place as the semantic label of the member places included in the group so that the semantic label of each place is determined.

Figure 17:
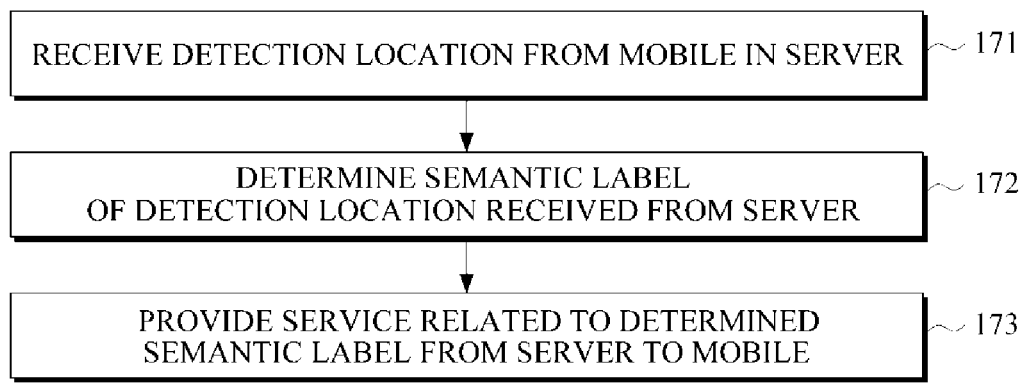
FIG. 17 is a flow chart illustrating a semantic labeling method, according to further another exemplary embodiment.

FIG. 17 is a flow chart illustrating a semantic labeling method, according to yet another exemplary embodiment. A semantic labeling method 170 illustrated in FIG. 17 is an exemplary embodiment that is performed as servers interact, where the servers are operatively connected to each other via a mobile device and the communications network. For example, a mobile device, such as a smartphone, a smart watch, or smart glasses, which the user carries or wears, is responsible for detecting the location of the user, and a remote server is responsible to determine a semantic label of the location of the use. At operation 171, the location of the user is detected in the mobile device, and the detected location is transmitted to the server.

With respect to the detected location received from the server, the semantic label may be determined in 172, in the same manner described above with reference to FIGS. 10 to 12, or in the same manner described hereinafter with reference to FIG. 18.

At operation 173, the method provides services related to the semantic label determined in the server from the server to the mobile device. For example, if the semantic label of the detected location indicates a place where a quiet environment is required, such as a museum, a school, and a library, the method provides a service of automatically changing the mobile device to vibration mode.

FIG. 18 is a flow chart illustrating a semantic labeling method, according to yet another exemplary embodiment. A semantic labeling method 180 illustrated in FIG. 18 shows a process of outputting a semantic label of a detected location. At operation 181, the method detects the location of the user. In one example, for the detected location, data including a value that indicates a geographical location, such as a GPS coordinates value or a cell ID, is enough.

At operation 182, the method identifies a place corresponding to the detected location. The place is a geographical area of a predetermined size where the location of the user has remained unchanged and that the user has visited for a predetermined period of time. The place is defined by a GPS coordinates value of the center of the place and a value, such as a radius, that indicates a size of the area. For example, the GPS coordinates value of the detected location is the center, and an area with a predetermined radius is identified as a place.

At operation 183, the method compares the identified place to the places stored in advance. The places stored in advance also include the GPS coordinates value and radius of its center. In such a case, when the places are compared, the GPS coordinates of the center of each place are compared to each other, and the method determines whether an error occurred within a range of the radius. As a result, in response to the GPS coordinates of the center being close to each other within the range of the radius, the places re determined to be places similar to each other.

After the comparison, at operation 184, in a case where the place corresponding to the detected location has a GPS coordinates value that is the same as or similar to any one of the places stored in advance, the method considers the place with the same or similar GPS coordinates value to be the place of the detected location. At operation 185, the method outputs the semantic label of the similar place as a label of the detected location. In contrast, at operation 184, in a case where the place corresponding to the detected location does not have the GPS coordinates value that is the same as or similar to any one of the places stored in advance, the method identifies the place as a new place. At operation 186, the method allocates a new place ID with respect to the identified place, generates place attribute information, and compares similarities between the identified place and the places of the group stored in advance.

Because the places of the group stored in advance have place attribute information, at operation 187, the method discovers a place with similar attributes, such as the number of user visits, the visit time, and the visit duration. Thus, because the new place may be included in the same group as the discovered place, at operation 288, the method outputs the semantic label of the group as a label of the detected location. At operation 187, in a case where the place with the similar attributes is not discovered, at operation 189, the method designates the new semantic label in a manner as described in operation 140 or operation 150 described with reference to FIG. 14 or 15.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A semantic labeling apparatus for estimating a service, comprising:
    a place identifier processor configured to, based on location data of a user, generate place attributes of places that indicate information of a user visit for each place of the places the user visits, wherein user location remains unchanged within the places for a predetermined period of time;
    a group identifier processor configured to cluster the places based on the place attributes, classify the places into groups, select, as a representative place, one member place of each of the groups based on derivative information being generated using the place attributes of the places, the generated derivative information including an accumulated number and time of user visits to the one member place during a day of a week, the one member place being determined to have a largest number of user visits of the places for another predetermined period of time, acquire a semantic label of the selected representative place, and designate the acquired semantic label of the representative place as the semantic label for a corresponding group;
    a label determiner processor configured to determine the designated semantic label for the corresponding group as a semantic label of each member place in the corresponding group, wherein
    in response to a current location of the user being determined to be a new place based on attributes of the new place, the label determiner processor is configured to estimate a semantic label of the new place based on a result of comparing the attributes of the new place with the generated place attributes of the places; and
    an estimator processor configured to estimate a service that the user is determined likely to need based on the determined semantic label for the corresponding group associated with the location data of the user and based on the estimated semantic label of the new place for the current location of the user, as determined by the label determiner processor.

2. The semantic labeling apparatus of claim 1, wherein the location data is detected by a sensor built in a mobile device.

3. The semantic labeling apparatus of claim 2, wherein the location data further comprises at least one of
    a geographical user location, an application type operated in the mobile device, a number of incoming or outgoing calls performed by the mobile device, a number of incoming or outgoing short message services (SMS), and behaviors of the user detected by a motion sensor built-in the mobile device.

4. The semantic labeling apparatus of claim 1, wherein the place attributes comprise identification information to distinguish between places and time information on a place of the places the user visits.

5. The semantic labeling apparatus of claim 4, wherein the place attributes further comprise information based on the time information on the place the user visits.

6. The semantic labeling apparatus of claim 5, wherein the place attributes further comprise information indicating an operating state of a mobile device of the user within the place.

7. The semantic labeling apparatus of claim 5, wherein the place attributes further comprise information indicating user behaviors performed in the place and detected by a mobile device.

8. The semantic labeling apparatus of claim 1, wherein the group identifier processor is configured to select the one member place of each of the groups as the representative place based on the place attributes of member places.

9. The semantic labeling apparatus of claim 1, wherein the group identifier processor is configured to select the one member place of each of the groups as the representative place based on information related to the user visit among the place attributes of member places of each of the groups.

10. The semantic labeling apparatus of claim 1, wherein the estimator processor is further configured to provide the estimated service to the user.

11. A processor-implemented semantic labeling method of estimating a service, comprising:
    generating, based on location data of a user, place attributes of places that indicate information of a user visit for each place of the places the user visits, wherein user location remains unchanged within the places for a predetermined period of time;
    clustering the places based on the place attributes, classifying the places into groups, selecting, as a representative place, one member place of each of the groups based on derivative information being generated using the place attributes of the places, the generated derivative information including an accumulated number and time of user visits to the one member place during a day of a week, the one member place being determined to have a largest number of user visits of the places for another predetermined period of time, acquiring a semantic label of the selected representative place, and designating the acquired semantic label of the representative place as the semantic label for a corresponding group;
    determining the designated semantic label for the corresponding group as a semantic label of each member place in the corresponding group, wherein
    in response to a current location of the user being determined to be a new place based on attributes of the new place, estimating a semantic label of the new place based on a result of comparing the attributes of the new place with the generated place attributes of the places; and estimating a service that the user is likely to need based on the determined semantic label for the corresponding group associated with the location data of the user and based on the estimated semantic label of the new place for the current location of the user.

12. The semantic labeling method of claim 11, wherein the location data is detected by a sensor built in a mobile device.

13. The semantic labeling method of claim 12, wherein the location data further comprises at least one of
a geographical user location, an application type operated in the mobile device, a number of incoming or outgoing calls performed by the mobile device, a number of incoming or outgoing short message services (SMS), and behaviors of the user detected by a motion sensor built in the mobile device.

14. The semantic labeling method of claim 11, wherein the place attributes comprise identification information to distinguish between places and time information on a place of the places the user visits.

15. The semantic labeling method of claim 14, wherein the place attributes further comprise information based on the time information on the place the user visits.

16. The semantic labeling method of claim 15, wherein the place attributes further comprise information indicating an operating state of a mobile device of the user within the place.

17. The semantic labeling method of claim 15, wherein the place attributes further comprise information indicating user behaviors performed in the place and detected by a mobile device.

18. The semantic labeling method of claim 11, further comprising:
selecting the one member place of each of the groups as the representative place based on the place attributes of member places.

19. The semantic labeling method of claim 11, further comprising:
selecting the one member place of each of the groups as the representative place based on information related to the user visit among the place attributes of member places of each of the groups.

20. A non-transitory computer readable medium configured to control a processor to perform the semantic labeling method of claim 11.

21. A processor-implemented semantic labeling method of estimating a service, comprising:
generating, based on location data of a user, place attributes of places that indicate information of a user visit for each place of the places the user visits, wherein user location remains unchanged within the places for a predetermined period of time;
clustering the places based on the place attributes;
classifying the places into groups;
selecting, as a representative place, one member place of each of the groups based on derivative information being generated using the place attributes of the places, the generated derivative information including an accumulated number and time of user visits to the one member place during a day of a week, the one member place being determined to have a largest number of user visits of the places for another predetermined period of time;
acquiring a semantic label of the selected representative place;
designating the acquired semantic label of the representative place as the semantic label for a corresponding group;
determining the designated semantic label for the corresponding group as a semantic label of each member place in the corresponding group; and
in response to a current location of the user being determined to be a new place based on attributes of the new place, estimating a semantic label of the new place based on a result of comparing the attributes of the new place with the generated place attributes of the places.

* * * * *